United States Patent [19]

Nunes

[11] Patent Number: 4,749,281

[45] Date of Patent: Jun. 7, 1988

[54] UNIVERSAL THERMOMETER MOVEMENT

[76] Inventor: Brendon G. Nunes, 1035 Toy Ave., Unit 6, Pickering, Ontario, Canada L1W 3N9

[21] Appl. No.: 6,153

[22] Filed: Jan. 23, 1987

[51] Int. Cl.[4] ............................................. G01K 05/70
[52] U.S. Cl. ......................................... 374/206; 374/1; 374/208
[58] Field of Search ............................. 374/206, 208, 1

[56] References Cited

U.S. PATENT DOCUMENTS

| | | | |
|---|---|---|---|
| 1,672,388 | 6/1928 | McWilliam | 73/431 |
| 2,123,532 | 7/1938 | Hastings et al. | 73/431 X |
| 2,267,056 | 12/1941 | Tracy | 73/741 X |
| 2,290,328 | 7/1942 | Hedfield et al. | 374/208 |
| 2,668,446 | 2/1954 | Kraemer | 374/206 |
| 2,701,964 | 2/1955 | Argabrite | 374/208 X |
| 2,893,245 | 7/1959 | Bradbury | 374/208 X |
| 3,605,498 | 9/1971 | Lamb | 374/206 X |
| 3,818,763 | 6/1974 | Berleyoung et al. | 374/206 |
| 3,851,529 | 12/1974 | Andrews et al. | 374/206 |

Primary Examiner—Daniel M. Yasich

[57] ABSTRACT

A universal thermometer movement comprising a casing, a coil support means rotatably mounted within said casing, a bimetal coil element seated within the coil support means with an outer end thereof attached to said coil support means, and an inner end thereof attached to an arbor which projects externally of the casing whereby the temperature sensitive response of the coil element will be transmitted externally of the casing by means of the arbor, and whereby rotation of the coil support means calibrates the movement.

2 Claims, 3 Drawing Sheets

UNIVERSAL THERMOMETER MOVEMENT

FIELD OF INVENTION

This invention relates to thermometers which are actuated by a temperature responsive bimetal coil. More particularly, this invention relates to a universal thermometer movement device which is adaptable as a driving element for a wide variety of designs of thermometers.

BACKGROUND OF THE INVENTION

It is well known in the art of thermometers to use a bimetal coil which responds to changes in temperature by coiling or uncoiling. Typically, in a thermometer using a bimetal coil, the temperature response of the bimetal coil actuates an indicator means (for example a pointer or needle). The displacement of the indicator may be measured against a background of a graduated scale to obtain a temperature reading.

In the prior art a thermometer of the type discussed above typically would have been manufactured as an integral unit in which a bimetal coil, arbors and associated components interact with one another in such a way that the specifications, tolerances and other design criteria are inextricably intertwined. Therefore, the element components are not readily adaptable or transferable to other devices. Examples of such prior art devices are disclosed in Hastings, U.S. Pat. Nos. 2,123,532 issued July 12, 1938, Argabrite, 2,701,964 issued Feb. 15, 1955, and Andrews, 3,851,529, issued Dec. 3, 1974. Manufacturers of thermometers must continually respond to changing market appetites by introducing new designs of thermometers which follow decorating trends. There is perceived, therefore, a need for a universal thermometer movement which will be readily adaptable to drive a variety of designs. Accordingly, thermometer design and manufacture can be done by persons mainly interested in the aesthetics rather than in the mechanics of thermometers.

Thermometers utilizing a bimetal coil may require calibration from time to time. Typically, in thermometers utilizing a bimetal coil, one end of the coil is anchored to a fixed reference point while the other end is connected to movable indicating means. As discussed in Berleyoung, U.S. Pat. No. 3,818,763, issued June 25, 1970, the anchoring of the coil to the fixed reference point may be inaccurate, resulting in poor calibration and erroneous readings. Berleyoung suggests that the calibration problem might be resolved by anchoring the inner end of the coil to a rotatable hub. A flanged extension is provided at the outer (free) end of the coil. The flanged extension undergoes displacement in an arc as the coil responds to changes in temperature. The flanged extension itself is used as the thermometer indicator means to be read in relation to a dial. The device can be calibrated by rotating the hub (and associated coil) to the desired reading.

The device disclosed by Berleyoung does not however allow for the use of indicating means which rotate about a fixed point, such as pointers or needles, as opposed to indicating means which are displaced in an arc, since the "free" outer end of the coil element of Berleyoung undergoes translation rather than rotation. It follows also that the Berleyoung device does not allow calibration of such indicating means. Moreover, it is thought that such a device is not as readily adaptable to a universal thermometer movement since the translational movement is more limited than rotational movement from the point of view of the range of aesthetic designs which may be developed about it.

OBJECTS

It is an object of this invention to provide a novel universal thermometer movement capable of being incorporated in and used with a variety of thermometer housings, indicators and scales.

It is a further object of this invention to provide a novel universal thermometer movement capable of being readily calibrated for rotational indicating means.

It is yet a further object of this invention to provide a novel universal thermometer movement which is simple and economical to manufacture, and easy to use and calibrate which may be adapted to a great variety of thermometer casing designs.

DESCRIPTION OF THE INVENTION

The universal thermometer movement of this invention comprises in combination: a casing, a coil support means, a bimetal coil having an outer end and an inner end, and an arbor, wherein

- the casing comprises two parts which fit together and has means for attaching the casing to a thermometer, one of the parts having an aperture adapted to rotatably receive the arbor therethrough, the other of the parts having an aperture adapted to provide access to the coil support means;
- the coil support means is mounted rotatably within the casing and is adapted to support the bimetal coil and to fix the outer end thereof to the coil support means;
- the outer end of the bimetal coil is adapted to be affixed to the coil support means, and the inner end of the bimetal coil is adapted to be attached to the arbor;
- the arbor is adapted to be attached to the inner end of the coil, to project rotatably through the top portion aperture and to transmit rotation of the coil externally thereof;
- whereby rotation of the coil support means relative to the casing calibrates said movement.

More particularly, the invention includes top and bottom parts of an exterior casing which fit together to form an enclosure. A drum shaped coil support member is rotatably mounted between the top and bottom parts of the casing. The bimetal coil element comprises a length of bimetallic ribbon which coils inwardly upon itself to terminate inwardly at a centrally located inner end of said coil element and an outer end. The bimetal coil element is seated within the drum shaped coil support member and the outer end of the coil element is secured to the said coil support member. An arbor is attached to the inner end of the bimetal coil element and rotatably extends through an aperture in the top casing to permit transmission through the top casing of the rotation of the inner end of the coil in response to temperature change. A variety of indicating means may be secured to the portion of the arbor which protrudes externally of the casing. The assembly according to the invention may be calibrated by applying rotation to the drum shaped member, access to which is provided through an opening in the bottom part of the casing.

In another aspect of the invention, a universal thermometer movement comprises in combination a coil support means, a casing, a bimetal coil element, an arbor and attachment means as more particularly described below. The coil support means is drum shaped and includes a base portion, a peripherally upstanding wall portion, a hub located centrally of said base portion and including an aperture located centrally thereof. The hub includes means adapted for receiving a suitable tool means for applying rotation to the hub. The casing means comprises a top part and a bottom part, means for securing the top part to the bottom part so as to sandwich the coil support means therebetween and to rotatably mount same within said casing means. The top part includes an aperture aligned with the aperture of the hub and further includes annular means for rotatably seating the upper edges of the peripheral upstanding wall portion thereagainst. The bottom part includes an aperture aligned with the aperture of the hub and of a diameter adapted to rotatably receive the hub. The casing also includes attachment means to permit it to be affixed to the thermometer which will house the thermometer movement. The bimetal coil element has inner and outer ends and is disposed within the coil support means with the outer end being engaged with the coil support means to move therewith, and with the inner end in alignment with the apertures. The arbor extends through said apertures and has an inner end secured to the inner end of said bimetal coil element and an outer end projecting externally of the casing through the aperture of the top part. The movement further includes means for securing suitable indicating means thereto. Applying rotation to the coil support means relative to the casing calibrates the movement and said indicating means.

DESCRIPTION OF THE PREFERRED EMBODIMENT

Description of The Drawing Figures

FIG. 1a is a rear view of the preferred embodiment of the invention housed within a thermometer

In the Figures of the preferred embodiment of the invention, like numerals indicate like elements.

SUMMARY

FIG. 1a illustrates the preferred embodiment of the thermometer movement 3 according to the invention as it would appear when housed within a thermometer 5.

Figure 1:
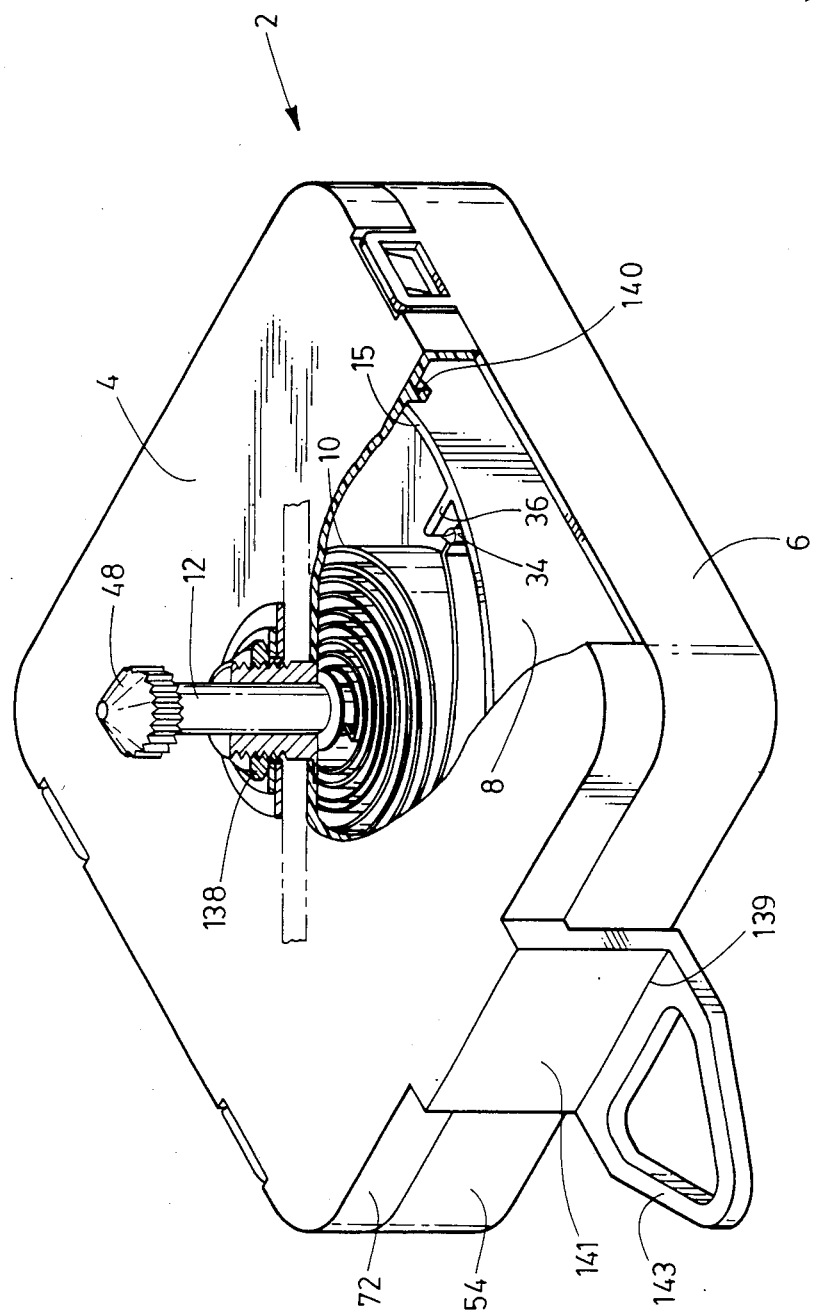
FIG. 1 is a perspective, partially cut out view of the preferred embodiment of the invention.

Referring to FIG. 1, the preferred embodiment of the invention includes a casing 2 having top 4 and bottom 6 parts, a drum shaped coil support member 8 adapted to be rotatably sandwiched between top part 4 and bottom part 6, a bimetal coil element 10 disposed within coil support member 8 and an arbor 12 for transmitting the temperature sensitive response of bimetal coil element 10 externally of casing 2. Suitable indicating means (represented by the dotted element 11) may be secured to the arbor 12 and may be compared with a graduated scale to provide a temperature reading.

Bimetal Coil and Coil Support Means

Figure 2:
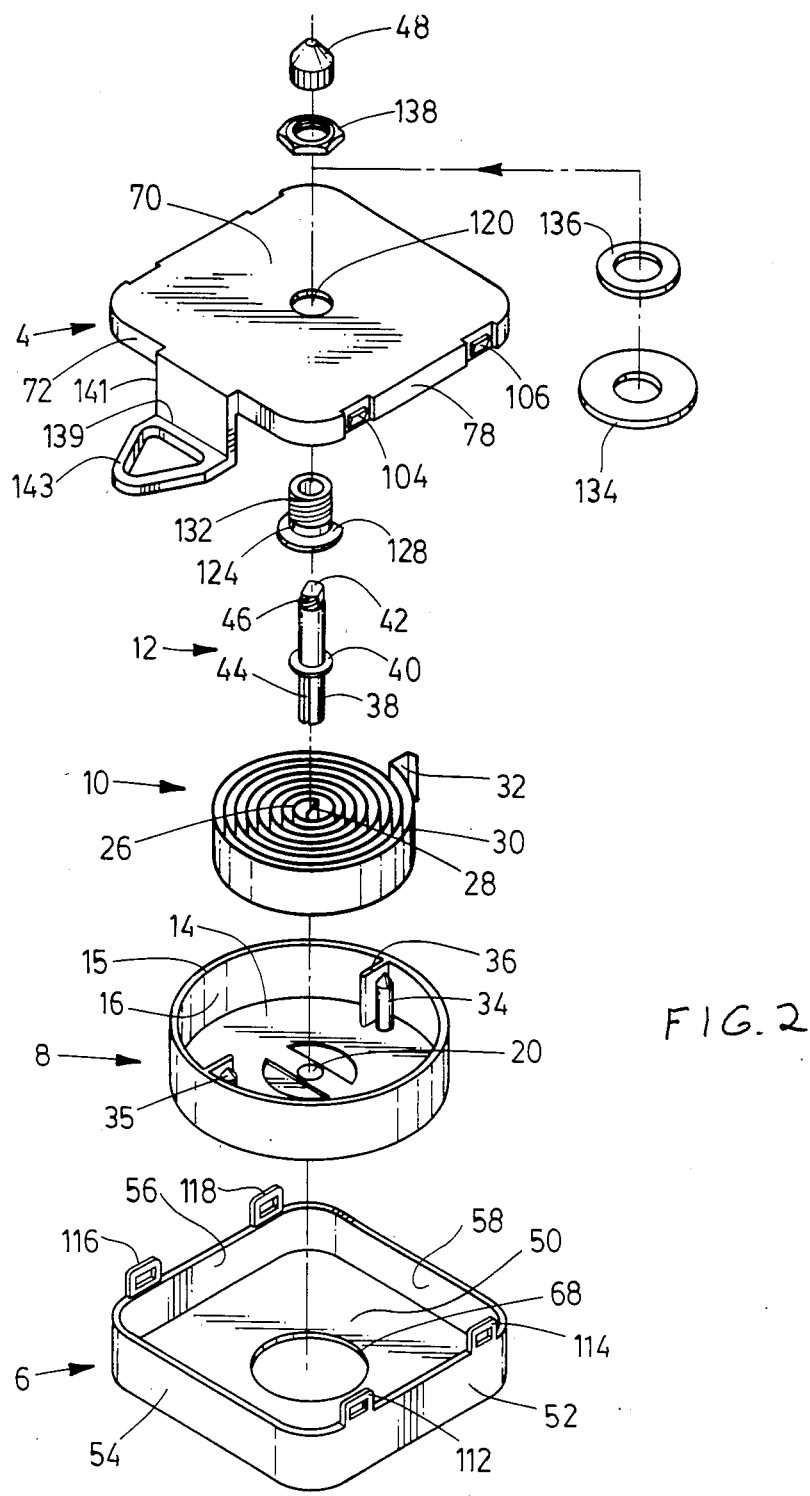
FIG. 2 is an exploded perspective view of the preferred embodiment of the invention illustrating the various components thereof.
Figure 3:
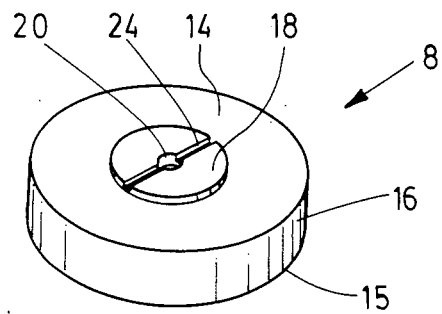
FIG. 3 is a perspective view of the coil support member of the preferred embodiment of the invention.

More particularly as best seen in FIGS. 2 and 3, a drum shaped coil support member, generally indicated by the numeral 8, includes a disc-like base portion 14, and a peripheral wall portion 16 upstanding from the edges of the base portion 14 and including an upper edge 15. The base portion 14 includes a hub 18, best seen in FIG. 3, located centrally thereof and an aperture 20 located centrally of the hub 18. The lowermost face 22 of hub 18 is provided with a groove 24 for receiving a suitable tool (not shown) for applying rotation to the coil support member 8 and thereby calibrating the movement device as more fully discussed below.

Coil support member 8 is adapted to receive a bimetal coil element 10 which includes an inner end 26 terminating in a flanged extension 28 and an outer end 30 terminating in a U-shaped portion 32.

Referring to FIGS. 1 and 2 bimetal coil element 10 is disposed within coil support member 8 with U-shaped portion 32 hooked around pin 34 upstanding from base portion 14 of coil support member 8, thereby anchoring bimetal coil element 10 to coil support member 8. The inner end 26 of bimetal coil element 10 is positioned in alignment with aperture 20 of hub 18. Peripheral upstanding wall portion 16 of coil support member 8 includes a radially inwardly extending wall portion 36 located adjacent pin 34 and which serves as an abutment surface for U-shaped portion 32. Another pin 35 is provided at 180 degrees from column 34 so as to enable bimetal coil element 10 to be inverted and positioned within coil support member 8 so as to effectively reverse the rotation of inner end 26 in response to temperature changes.

Arbor

An arbor 12 includes an inner end 38, a radial flange 40 located substantially centrally of the longitudinal extent thereof, and an outer end 42. The inner end 38 of arbor 12 is slotted longitudinally as at 44. Slot 44 is made sufficiently wide to accommodate flanged extension 28 of coil 10. The diameter of arbor 12 is incrementally less than the diameter of central aperture 20 of base portion 14, so as to enable the inner end 38 of arbor 12 to be rotatably received within aperture 20. In the assembled device according to the invention, the slotted inner end 38 of arbor 12 is fitted over flanged extension 28 and into central aperture 20 of base portion 14. The extremity of outer end 42 of arbor 12 is provided with threads 46 for receiving a lug 48 to secure suitable indicating means 11 to the outer end 42 of arbor 12.

Casing

As best seen in FIG. 1, coil support member 8 is enclosed within casing 2 comprising a top part 4 and a bottom part 6 between which coil support member 8 is sandwiched.

Referring to FIG. 2, bottom part 6 of casing 2 includes a generally square base portion 50, and wall portions 52, 54, 56, 58 extending upwardly from the outer edges of base portion 50. Base portion 50 includes a central aperture 68 of diameter incrementally greater than the diameter of hub 18 such that when coil support member 8 is disposed between top part 4 and bottom part 6, it may be rotated within the said aperture 68.

Figure 4:
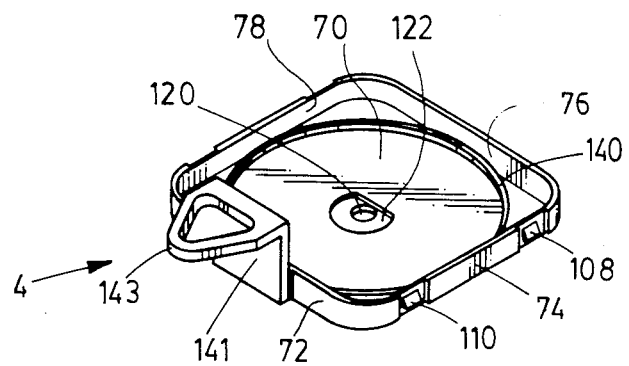
FIG. 4 is a perspective view of the bottom part of the casing of the preferred embodiment of the invention.

Referring to FIGS. 2 and 4, top part 4 of casing 2 includes a generally square planar portion 70 and wall portions 72, 74, 76, 78 extending downwardly from the outer edges of planar portion 70. The lowermost edges of wall portions 72, 74, 76, 78 are co-planar and are adapted to register with the uppermost edges of wall portions 52, 54, 56, 58 of bottom part 6 which are also co-planar such that when such edges are brought into registration with one another, the top part 4 and the bottom part 6 combine to form an enclosure.

Walls 72 and 76 of the top part 4 include a plurality of clasps 104, 106, 108, 110 extending downwardly from and coplanar with wall portions 78 and 74.

Walls 52 and 56 of bottom part 6 include beveled catches 112, 114, 116, 118 extending upwardly from the wall portions 52 and 56. When top part 4 and bottom part 6 are urged together, clasps 104, 106, 108, 110 will engage catches 112, 114, 116, 118 and thereby secure top part 4 to bottom part 6.

Square planar portion 70 of top piece 4 includes a central aperture 120, aligned with the flanged extension 28 of bimetal coil element 10 and with the aperture 68 of bottom piece 6, and an indented partly peripheral groove 122 surrounding central aperture 120 (best seen in FIG. 4). A socket 124 for receiving arbor 12 is adapted to be fitted within central aperture 120 and includes a radially projecting flange 128 of a configuration complementary and adapted to be securely keyed into partly peripheral groove 122. The outer end 130 of socket 124 is threaded as at 132 to receive washers 134 and 136, and a nut 138 so as to tighten the socket 124 into place within central aperture 120.

When top piece 4 and bottom piece 6 are brought into registration so as to enclose coil support member 8 the outer end 42 of arbor 12 projects upwardly through socket 124 and therebeyond externally of casing 2.

Square planar portion 70 of top part 4 includes interiorly thereof an annular bead 140 (best seen in FIG. 4) of diameter incrementally greater than the diameter of the peripheral wall portion 16 of coil support member 8 such that, when top part 4 and bottom part 6 of casing 2 are brought into registration, the uppermost edges of wall portion 16 are rotatably seated in and against said annular bead 140.

Wall portion 72 of top part 4 is provided with a projection 141 extending downwardly alongside wall portion 72 an extent substantially equal to the combined vertical extent of wall portion 74 of top part 4 and wall portion 54 of bottom part 6. A generally triangular hook 143 extends at right angle from the outermost edge 139 of projection 141 and may be used to secure casing 2 to or within a casing 5 which house the thermometer movement 3.

OPERATION AND CALIBRATION

When the components of the invention are brought into operative relation, coil support member 8 is rotatably sandwiched and enclosed between the top and bottom pieces 4 and 6 of casing 2. The upper edge 15 of peripheral wall portion 16 is seated within annular bead 140 of top piece 4 and hub 18 is seated within central aperture 68 of bottom piece 6. The tolerances of the diameter of base portion 14, of hub 18 and of the height of peripheral wall portion 16, of coil support member 18 are chosen to ensure that there is sufficient friction between the contacting surfaces of the coil support member and the casing to prevent inadvertent rotation of the coil support member within the casing yet remain yielding enough to allow the coil support member to be intentionally rotated for calibration as discussed below.

Under the effect of an increase in temperature, the bimetal coil will tend to relax and unwind. Since the outer end 30 of the coil 10 is anchored to coil support member 8 by column 34, the reaction of the coil will be focussed at the inner end 26 thereof, and the flanged extension 28 will undergo rotation.

The rotation of flanged extension 28 will be applied to arbor 12 which is secured thereto by means of slot 44.

Suitable indicating means 11, for example a pointer, may be secured to the outer end 42 of arbor 12 by means of lug 48. The indicating means will thus be displaced according to the rotation of the arbor. The rotation of the arbor, and consequently the displacement of the indicating means are a function of the response of the coil to changes in temperature. The temperature can be read by comparing the displacement of the indicating means to a suitable reference scale.

It can be seen that the universal thermometer movement device according to the invention may be used in association with a variety of thermometers, the only limitation thereon being the availability of indicating means capable of being secured to the outer end 42 of arbor 12 and sufficient space within the thermometer to accommodate the device. It follows that the invention may be supplied or purchased as a self contained thermometer movement device apart from the other components of the thermometer and independently of their shape and other characteristics and those of the particular thermometer in relation to which the assembly is intended to be used.

Calibration of the device is accomplished by rotating coil support member 8 which will rotate coil 10 which is secured to the coil support member 8 by pin 34. The rotation is transmitted to the indicating means 11 by arbor 12. Calibration is complete when sufficient rotation has been applied to lead the indicating means to the desired reading on the scale. Rotation of the coil support member 8 is achieved by applying, by means of a suitable tool, rotation to hub 18. Access to hub 18 is provided by aperture 68 in bottom piece 6 of casing 2. Thus calibration may be accomplished rapidly and easily and without disassembling the device.

The embodiments in which an exclusive property or privilege is claimed are as follows:

1. A universal thermometer movement for use in a thermometer, comprising in combination a casing, a coil support means, a bimetal coil having an inner end and an outer end, and an arbor, wherein:
    said casing comprises two parts which fit together, said casing having means for attaching said casing to said thermometer, a first of said parts having an aperture adapted to rotatably receive said arbor therethrough, and the second of said parts having an aperture adapted to provide access to said coil support means;
    said coil support means are mounted rotatably within said casing and adapted to support said bimetal coil and to fix said outer end thereof to said coil support means;
    said outer end of said bimetal coil is adapted to be affixed to said coil support means, and said inner end is adapted to be attached to said arbor;
    said arbor is adapted to be attached to said inner end of said coil, to project rotatably through said aperture in said first of said parts of said casing and to transmit rotation of said coil externally thereof;
    whereby rotation of said coil support means relative to said casing calibrates said movement.

2. A universal thermometer movement for use in a thermometer, comprising:
    a drum shaped coil support means including a base portion, a peripherally upstanding wall portion, a hub located centrally of said base portion and including an aperture located centrally thereof, said hub including means adapted for receiving tool means for applying rotation to said hub;

a casing comprising a top part and a bottom part, means for securing said top part to said bottom part so as to sandwich said coil support means therebetween and to rotatably mount same within said casing, said top part including an aperture aligned with said aperture of said hub and further including annular means for rotatably seating the upper edges of said peripheral upstanding wall portion thereagainst, said bottom part including an aperture aligned with said aperture of said hub and of a diameter adapted to rotatably receive said hub;

said casing having attachment means to permit it to be affixed to said thermometer;

a bimetal coil element having inner and outer ends and being disposed within said coil support means with said outer end being engaged with said coil support means to move therewith, and with said inner end in alignment with said apertures;

an arbor extending through said apertures, having an inner end secured to said inner end of said bimetal coil element and an outer end projecting externally of said casing through said aperture of said top part, and including means for securing suitable indicating means to said outer end of said arbor;

whereby rotating of said coil support means calibrates said movement and said indicating means.

* * * * *